Patented Jan. 19, 1954

2,666,789

UNITED STATES PATENT OFFICE 2,666,789

α,β - (POLYHYDROXYARYL) - ALKANAMIDES AND METHODS FOR THEIR PRODUCTION

Kurt Rorig, Chicago, Ill., assignor to G. D. Searle & Co., Chicago, Ill., a corporation of Illinois No Drawing. Application May 29, 1951, Serial No. 228,999

13 Claims. (Cl. 260—559)

The present invention relates to a new group of organic amides and, in particular, to α,β-(polyhydroxyaryl) alkanamides and to methods for their production. The present application is a continuation-in-part of my copending application, Serial No. 167,265, filed June 9, 1950, now abandoned.

By this invention I have provided new compositions of matter which may be represented by the following structural formula

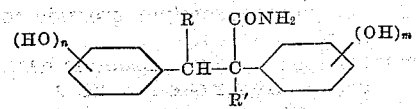

wherein R is a lower alkyl radical, R' is a member of the class consisting of hydrogen and lower alkyl radicals, and $n$ and $m$ are integers less than 3.

In the foregoing structural formula the radicals R and R' may represent such lower alkyl groups as methyl, ethyl and normal and branched chain propyl, butyl, pentyl and hexyl. The radical R' may also be hydrogen. The integers $n$ and $m$ may be 1 and 2.

The compounds of this invention have useful pharmacodynamic properties. Certain of them are effective as hormonal agents. These amides have a pronounced effect on the cardiovascular system, specifically as antihypertensive agents. These amides are also of value as intermediates in chemical synthesis, e. g. of such compounds as 3,4-bis-(p-hydroxyphenyl)-2-hexanone and its ethers, which are the subject of my copending application of Serial No. 191,493, filed October 21, 1950, now abandoned. They can also be used to produce the N,N-dialkyl and dialkylaminoalkyl derivatives by transamination.

The amides of this invention may be obtained by a number of methods. Thus, an alkenonitrile of the type

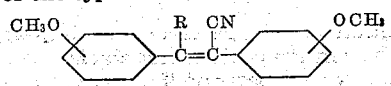

described in my application Serial No. 162,603, filed May 17, 1950, now abandoned, can be hydrogenated, e. g. by hydrogen in presence of platinum under pressure, to produce the alkyl nitrile of the type

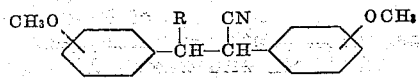

This same type of alkyl nitrile is prepared in excellent yield by condensing an alkoxybenzaldehyde with an alkoxybenzylcyanide and reacting the resultant acrylonitrile with an alkyl magnesium halide. The reaction may be described schematically as follows

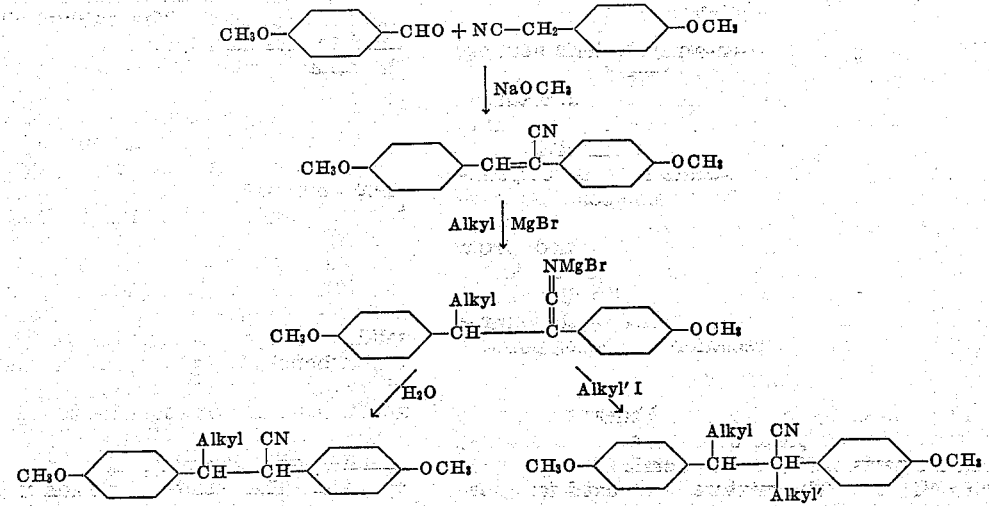

As indicated, the magnesium halide addition compound adds an alkyl halide to produce the α-alkyl derivative.

These types of nitriles are converted into the amides by treatment with a mixture of a hydrohalic acid, such as hydrobromic acid and of a polar organic solvent in which all the reactants are soluble, preferably glacial acetic acid, with simultaneous hydrolysis of the phenolic ethers to the free phenols. Etherification is accomplished by the usual methods, such as treatment with a dialkyl sulfate or alkyl halide in alkali. In order to verify the structure of the ethers thus produced, the α,β-di-(p-anisyl)valeramide was prepared also from the corresponding valeric acid. Mixed melting point tests confirm the identity of the ethers. The ethers are reconverted to the hydroxy compounds by treatment with pyridine hydrochloride or aluminum bromide.

The following examples illustrate in detail certain of the compounds which comprise this invention and methods for producing same. However, this invention is not to be construed as limited in spirit or in scope thereby. It will be apparent to chemists skilled in the art that many modifications in materials and methods may be made without departing from the invention. In each of these examples, uncorrected temperatures are given in degrees centigrade (°C.), relative amounts of materials in parts by weight and pressures during vacuum distillations in millimeters (mm.) of mercury.

*Example 1*

A solution of 100 parts of α,β-di-(p-anisyl)-valeronitrile in 700 parts of hot glacial acetic acid is treated with 570 parts of 48% hydrobromic acid and heated at refluxing temperature for 3 hours. Almost immediately after starting the reflux period, the solution becomes deep purple-blue. The color changes to reddish-purple after 10 minutes and finally light walnut-brown. The solution is then poured into 6000 parts of ice-cold water. The fine, almost gelatinous, white precipitate is filtered and washed with water. After two recrystallizations from ethyl acetate, the α,β-bis-(p-hydroxyphenyl)valeramide melts at about 274 to 275° C. It has the structural formula

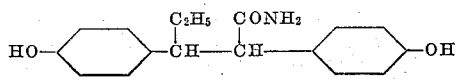

*Example 2*

Four parts of α,β-di-(p-anisyl)valeric acid are heated at refluxing temperature for 3 minutes with 66 parts of thionyl chloride. The resulting α,β-di-(p-anisyl)valeryl chloride is poured into 178 parts of a concentrated aqueous solution of ammonia. The pinkish-white solid is recrystallized from absolute alcohol to give colorless crystals melting at about 277 to 229° C. The same α,β-di-(p-anisyl)valeramide is obtained from α,β-bis-(p-hydroxyphenyl)valeramide by treatment with dimethyl sulfate and with diazomethane. Mixtures of crystals obtained by these three methods show no depreciation in melting point.

*Example 3*

19 parts of α,β-di-(m-anisyl)butyronitrile are dissolved in 140 parts of hot glacial acetic acid and 148 parts of 48% hydrobromic acid are added with stirring. The mixture is refluxed for a period of 4 hours; color changes similar to those mentioned in Example 1 occur. The solution is then poured on 1000 parts of ice water. The white precipitate is collected on a filter, washed several times with water and recrystallized from ethyl acetate. Analysis shows the white crystals to consist of pure α,β-bis-(m-hydroxyphenyl)-butyramide.

*Example 4*

A solution of 23 parts of metallic sodium in 420 parts of 90% aqueous ethanol, 13.5 parts of the α,β-bis-(m-hydroxyphenyl)butyramide and 20 parts of ethyl iodide are heated on the steam bath until a sample no longer indicates an alkaline reaction. The mixture is then evaporated to dryness and the α,β-bis-(m-ethoxyphenyl)butyramide is obtained in colorless crystals upon recrystallization from absolute alcohol. It has the structural formula

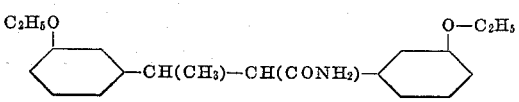

*Example 5*

To a solution of 44 parts of m,p-dimethoxyphenylacetonitrile and 34 parts of p-anisaldehyde in 160 parts of methanol a solution of 13.5 parts of sodium methoxide in 56 parts of methanol is added. The creamy yellow product begins to form at once. After standing for several hours, the α - (m,p - dimethoxyphenyl) - β - (p-anisyl) - acrylonitrile is collected on a filter and recrystallized from ethanol in the form of light yellow crystals, which melt at about 131 to 132° C.

A solution of 141 parts of this product in 880 parts of thiophene-free benzene is treated in the course of 10 minutes at 65° C. with a solution of 69.5 parts of ethyl magnesium bromide in 370 parts of ether. A greenish-yellow, viscous oil forms immediately. The suspension is heated at refluxing temperature for one-half hour, then decomposed by pouring upon ice and dilute sulfuric acid. After thorough stirring the organic layer is dried briefly over anhydrous potassium carbonate and evaporated to yield a brown oil which slowly solidifies on standing. On recrystallization from 95% ethanol a crystalline racemic isomer of α - (m,p-dimethoxyphenyl) -β-(p-anisyl)valeronitrile is obtained, which melts at about 112.5 to 114.5° C.

The ethanol is removed by evaporation from the mother liquor from which the solid isomer had been obtained. The residual oil is then distilled to give an approximately equal amount of the other racemic isomer of α-(m,p-dimethoxyphenyl)-β-(p-anisyl)valeronitrile, which boils at 197 to 202° C. at 0.5 mm. pressure. On standing, the oil solidifies to a glassy material.

36 parts of the solid crystalline isomer of α-(m,p - dimethoxyphenyl) - β-(p-anisyl)valeronitrile, melting at about 112.5 to 114.5° C., are hydrolyzed for 40 hours by 15 parts of sodium hydroxide in 280 parts of ethylene glycol containing 10% water. Upon acidification of the alkaline solution a brown oil is obtained which solidifies on standing. This is recrystallized from 90% ethanol to give a crystalline racemic isomer of α-(m,p-dimethoxyphenyl)-β-(p-anisyl)valeric acid which melts at about 141 to 142° C.

20 parts of this material are refluxed for 3 minutes with 200 parts of water-white thionyl chloride. The resulting solution is poured cautiously into 440 parts of concentrated aqueous ammonium hydroxide. The tan colored precipitate is filtered, washed and recrystallized from ethanol to yield white crystals of α-(m,p-dimethoxyphenyl)-β-(p-anisyl)valeramide, melting at about 177 to 178° C. This compound has the structural formula

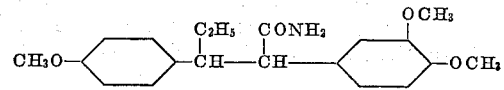

Example 6

50 parts of α-(m,p-dimethoxyphenyl)-β-(p-anisyl)valeronitrile are refluxed for 2 hours in a solution containing 225 parts of 48% aqueous hydrobromic acid and 200 parts of glacial acetic acid. The mixture is poured into 3000 parts of cold water whereupon an oil separates which is extracted with ether. The ethereal solution is extracted with 1000 parts of a 4% aqueous sodium hydroxide solution. The alkaline extract is rendered acidic by addition of dilute hydrochloric acid and the oil which separates is extracted with ether. The ether extract is dried over anhydrous sodium sulfate, filtered and evaporated. A glasslike, amorphous solid mixture of the two racemic α-(m,p-dihydroxyphenyl)-β-(p-hydroxyphenyl)valeramides is thus obtained.

The same compounds are obtained from the α-(m,p-dimethoxyphenyl)-β-(p-anisyl)-valeramides, described in the preceding sample, by refluxing 10 parts of these tri-ethers with 50 parts of freshly distilled pyridine hydrochloride for 45 minutes. The products have the structural formula

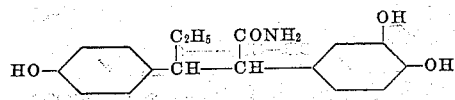

Example 7

To a solution of 133 parts of ethyl magnesium bromide in 640 parts of absolute ether are added portionwise in 30 minutes 76 parts of α,β-di-(p-anisyl)acrylonitrile. After refluxing for 4 hours there are added dropwise in the course of 5 minutes 80 parts of methyl iodide. The mixture is refluxed for one hour and then decomposed with ice and hydrochloric acid. The ethereal layer is separated, dried over anhydrous potassium carbonate and distilled to give the mixture of two racemic isomers of α,β-di-(p-anisyl)-α-methylvaleronitrile. This is a viscous white oil boiling at about 162–165° C. at 0.003 mm. pressure.

48 parts of a mixture of the two racemic α,β-di-(p-anisyl)-α-methylvaleronitriles is heated under reflux in a copper flask with 365 parts of diethylene glycol, 16 parts of sodium hydroxide pellets and 25 parts of water for 25 hours. The hot solution is poured into 1000 parts of water, from which an insoluble, grey, semi-solid material is obtained by decantation of the liquid. The liquid is rendered acidic by addition of dilute hydrochloric acid and a precipitate of the racemic α,β-di-(p-anisyl)-α-methylvaleric acids forms. The grey semisolid product remaining after the above decantation is triturated with ether to give a precipitate of the higher melting, solid racemic isomer of α,β-di-(p-anisyl)-α-methylvaleramide. The ether solution is evaporated to give an oil, containing principally the lower melting racemic isomer of α,β-di-(p-anisyl)-α-methylvaleramide. The higher melting form, recrystallized from ethanol, melts at about 162–163° C. The structural formula is

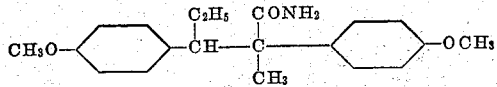

Example 8

10 parts of a mixture of the two racemic α,β-di-(p-anisyl)-α-methylvaleronitriles, prepared as in Example 7, are refluxed for 4 hours in a solution containing 50 parts of glacial acetic acid and 57 parts of a 48% aqueous hydrobromic acid solution. The deep purple solution is poured into 500 parts of water to yield a white, semi-solid product which is separated and recrystallized from 2-nitropropane to yield mainly the higher-melting, racemic α,β-bis-(p-hydroxyphenyl)-α-methylvaleramide, which melts at about 225–234° C. The nitropropane mother liquor is evaporated to yield an oil rich in the lower-melting, racemic α,β-bis-(p-hydroxyphenyl)-α-methylvaleramide.

The products are likewise obtainable from the ethers described in Example 7, by refluxing 20 parts of the α,β-di-(p-anisyl)-α-methylvaleramides for 45 minutes with 100 parts of freshly distilled pyridine hydrochloride. The products have the structural formula

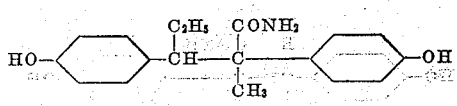

Example 9

To a solution of 119 parts of methyl magnesium bromide in 640 parts of absolute ether are added in the course of 30 minutes 76 parts of α-(o-anisyl)-β-(p-anisyl)acrylonitrile, prepared according to the method of J. B. Niederl and A. Ziering (Journal American Chemical Society, vol. 64, pages 995 et seq.; 1942). The mixture is refluxed for 5 hours and then 90 parts of ethyl iodide are added dropwise. Refluxing is resumed for one hour, after which the mixture is poured over ice and hydrochloric acid. The ether layer is separated, dried over anhydrous potassium carbonate, filtered and evaporated. The residue is a viscous oil which consists of the mixture of the two racemic isomers of α-(o-anisyl)-α-ethyl-β-(p-anisyl)butyronitrile.

20 parts of this mixture of isomers, 100 parts of glacial acetic acid and 120 parts of a 48% aqueous hydrobromic acid solution are heated at refluxing temperature for 4 hours. The resulting mixture is poured into 1000 parts of ice water to yield a whitish precipitate. The supernatant is decanted and the residue dissolved in hot nitropropane. On cooling, the higher melting isomer of α-(o-hydroxyphenyl)-α-ethyl-β-(p-hydroxyphenyl)butyramide is obtained. Evaporation of the mother liquor yields the lower melting form. The products have the structural formula

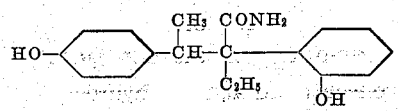

I claim:
1. The amides of the structural formula

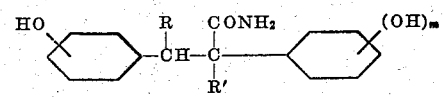

wherein R represents a lower alkyl group, R' represents a member of the class consisting of hydrogen and lower alkyl groups, and m is a positive integer less than 3.

2. The α,β-bis-(hydroxyphenyl)alkanamides of the structural formula

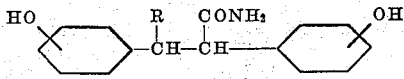

wherein R represents a lower alkyl group.

3. The α,β-bis-(p-hydroxyphenyl)alkanamides of the structural formula

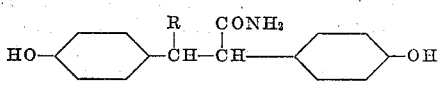

wherein R represents a lower alkyl group.

4. The α,β-bis-(hydroxyphenyl)-α-alkylalkanamides of the structural formula

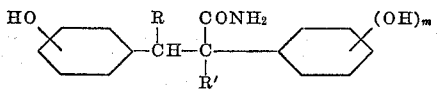

wherein R and R' represent lower alkyl groups and m is a positive integer less than 3.

5. The α,β-bis-(p-hydroxyphenyl)alkanamides of the structural formula

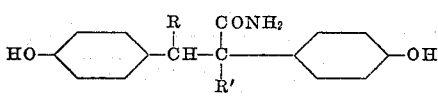

wherein R and R' represent lower alkyl groups.

6. The process of producing an amide of the structural formula

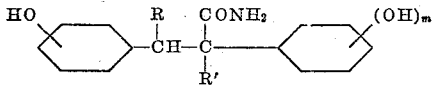

wherein R represents a lower alkyl group, R' represents a member of the class consisting of hydrogen and lower alkyl groups and m is a positive integer smaller than 3, which comprises the heating of a nitrile of the structural formula

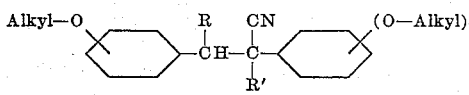

wherein R and R' and m are defined as hereinabove, with a concentrated aqueous hydrogen halide in strong acetic acid substantially at the boiling point of the mixture.

7. The process of producing an α,β-bis-(hydroxyphenyl)alkanamide of the structural formula

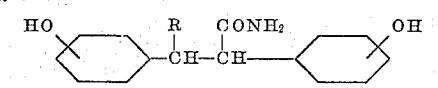

wherein R is a lower alkyl group, which comprises the heating of an α,β-dianisylalkyl cyanide of the structural formula

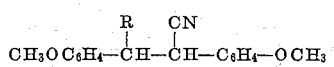

with a concentrated aqueous hydrogen halide in glacial acetic acid at the boiling point of the mixture.

8. The process of producing an α,β-bis-(p-hydroxyphenyl)alkanamide of the structural formula

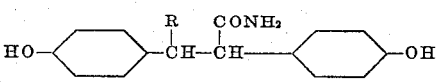

wherein R is a lower alkyl group, which comprises the heating of an α,β-di-(p-anisyl)-alkyl cyanide of the structural formula

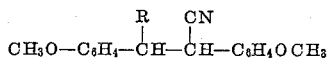

with concentrated hydrobromic acid in glacial acetic acid at the boiling point of the mixture.

9.

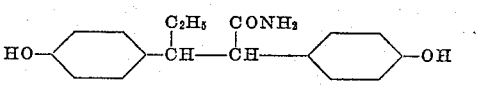

10. The α,β-bis-(hydroxyphenyl)butyramides.

11. The α-dihydroxyphenyl-β-hydroxyphenyl-alkanamides of the structural formula

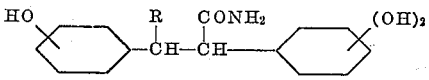

wherein R represents a lower alkyl group.

12.

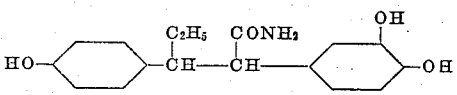

13.

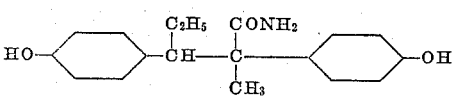

KURT RORIG.

References Cited in the file of this patent
UNITED STATES PATENTS

| Number | Name | Date |
|---|---|---|
| 2,015,580 | Alles | Sept. 24, 1935 |
| 2,276,618 | Kulz | Mar. 17, 1942 |
| 2,400,433 | Natelson | May 14, 1946 |
| 2,489,348 | Wenner | Nov. 29, 1949 |
| 2,499,920 | Hunter et al. | Mar. 7, 1950 |
| 2,503,285 | McPhee | Apr. 11, 1950 |
| 2,567,873 | Burtner | Sept. 11, 1951 |

OTHER REFERENCES

Migrdichian: "The Chemistry of Organic by Cyanogen Compounds," (1947), pp. 37 and 46.